United States Patent [19]

Franssen

[11] 4,223,573
[45] Sep. 23, 1980

[54] AUTOMATIC SPEED-CHANGING SYSTEM FOR HEAVYDUTY AUTOMOTIVE EQUIPMENT

[75] Inventor: Jean Franssen, Ougrée, Belgium

[73] Assignee: Societe Anonyme C.E.T.I.M., Chênée, Belgium

[21] Appl. No.: 936,597

[22] Filed: Aug. 24, 1978

Related U.S. Application Data

[63] Continuation-in-part of Ser. No. 694,968, Jun. 11, 1976, abandoned.

[30] Foreign Application Priority Data

Jun. 12, 1975 [BE] Belgium .................................. 45045

[51] Int. Cl.$^2$ ............................................. B60K 41/04
[52] U.S. Cl. ........................................ 74/858; 74/866
[58] Field of Search ................ 74/856, 858, 859, 866, 74/360, 745

[56] References Cited

U.S. PATENT DOCUMENTS

| | | | |
|---|---|---|---|
| 3,682,014 | 8/1972 | Magg et al. | 74/866 X |
| 3,759,344 | 9/1973 | Blee et al. | 180/105 E |
| 4,145,936 | 3/1979 | Herlitzek | 74/360 X |

Primary Examiner—C. J. Husar
Assistant Examiner—Frank McKenzie
Attorney, Agent, or Firm—Montague & Ross

[57] ABSTRACT

An automotive transmission with three forward speeds and three reverse speeds is automatically upshifted or downshifted under the control of a speed sensor coacting with an output shaft of that transmission. The engine is automatically decelerated and accelerated during upshifting and downshifting, respectively, for a smooth transition from one speed ratio to the next. A changeover from forward driving to reverse, or vice versa, with the aid of a manual mode selector is possible only at relatively low shaft speeds. Another manual selector is settable to limit the operation of the system to one or two speed ratios in either the forward or the reverse mode.

6 Claims, 11 Drawing Figures

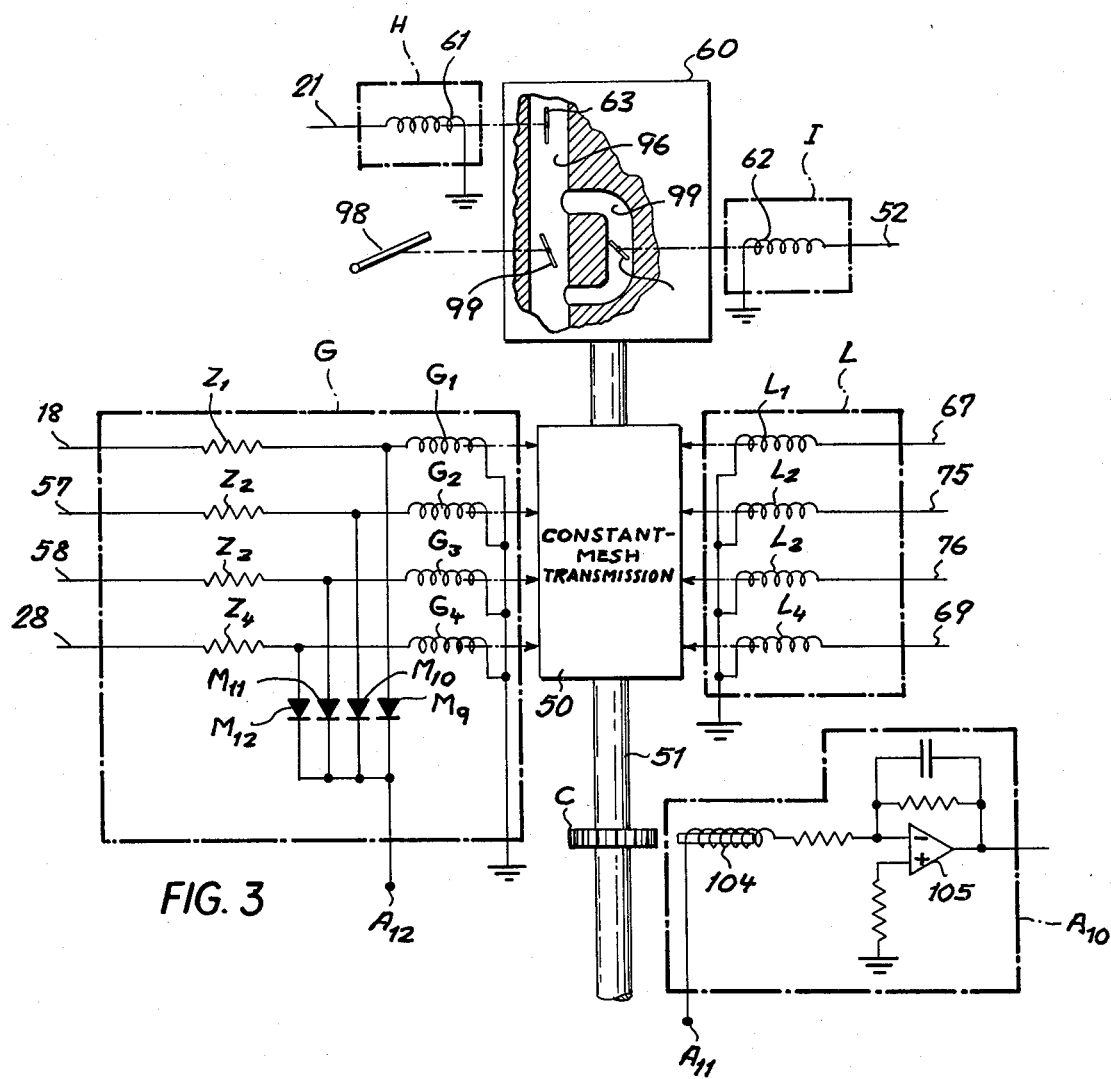
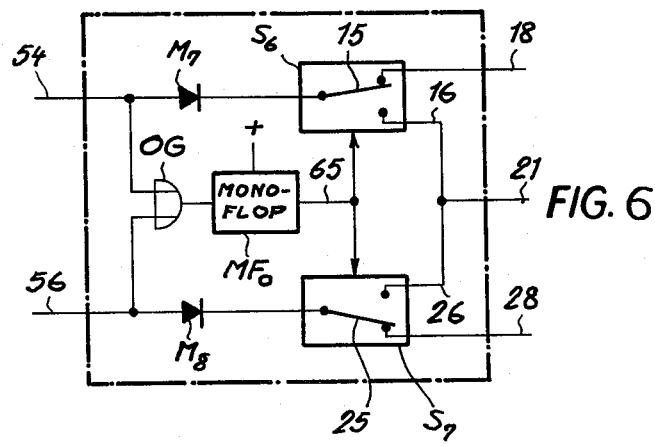
FIG. 3
FIG. 6

| Solenoid \ Mode | Forward ($D_1$) | Neutral ($D_2$) | Reverse ($D_3$) |
|---|---|---|---|
| $G_1$ | X | | |
| $G_2$ | | X | X |
| $G_3$ | X | X | |
| $G_4$ | | | X |

|←— ΔT —→|        |←— ΔT —→|

FIG. 9

| Solenoid \ Gear | 1st | 2nd | 3rd |
|---|---|---|---|
| $L_1$ | X | | |
| $L_2$ | | X | X |
| $L_3$ | X | X | |
| $L_4$ | | | X |

FIG. 10

| Output \ Gear | 1 | Upshift 1→2 | 2 | Upshift 2→3 | 3 | Downshift 3→2 | 2 | Downshift 2→1 | 1 |
|---|---|---|---|---|---|---|---|---|---|
| 81 | X | | X | | X | X | X | X | X |
| 82 | X | X | X | X | X | | X | | X |
| 83 | | X | X | X | X | X | X | | |
| 84 | | | | X | X | | | | |

FIG. 11

AUTOMATIC SPEED-CHANGING SYSTEM FOR HEAVYDUTY AUTOMOTIVE EQUIPMENT

CROSS-REFERENCE TO RELATED APPLICATION

This is a continuation-in-part of my copending application Ser. No. 694,968 filed June 11, 1976 now abandoned.

FIELD OF THE INVENTION

My present invention relates to an automatic speed-changing system for an automotive vehicle or other equipment of the heavy-duty type used in construction work or the like.

BACKGROUND OF THE INVENTION

Bulldozers and other heavy-duty vehicles are frequently required to operate both forward and backward with a plurality of speed ratios or "gears," generally a low speed ratio or "first gear," an intermediate speed ratio or "second gear" and a high speed ratio or "third gear." In order to transmit the requisite torque from an internal-combustion engine to an output shaft, designed to drive the traction wheels of the vehicle and possibly other loads as well, use is often made of constant-mesh transmissions comprising a gear train wherein gears on parallel shafts are in permanent engagement with each other but may be selectively coupled with or decoupled from the respective shafts by clutch gears slidable on splined shaft portions under the control of a fluidic actuator such as a pneumatic or hydraulic jack. In changing from a lower speed ratio to a higher one, a procedure known as upshifting, the engine-driven input shaft of the transmission must be accelerated with reference to the output shaft for a smooth transition. Conversely, a change from a higher speed ratio to a lower one—known as downshift—requires a relative acceleration of the input shaft. With a manual transmission, therefore, the driver is expected to depress the acceleration pedal in the brief interval during which the shafts are effectively decoupled on the upshift and to throttle the engine during the corresponding interval on the downshift.

The use of speed sensors for an automatic upshifting and downshifting, in response to variations in shaft speed, is also known in the art. With such automatic transmissions the driver can no longer change the engine speed at just the right moment, yet this speedup or slowdown is not required with transmission systems of the planetary-gear type using hydraulically operated clutches and brakes without gear teeth.

OBJECTS OF THE INVENTION

An important object of my invention, therefore, is to provide means in a reversible speed-changing system for insuring a smooth switchover with a gear-type transmission without requiring an intervention on the part of the driver or operator.

Another object is to provide means for preventing untimely changeovers between forward and reverse modes at shaft speeds exceeding a preset limit at which such operations cannot be safely carried out without risk to the integrity of the transmission.

SUMMARY OF THE INVENTION

A speed-changing system according to my invention comprises manually operable selector means connected to a first gear-shifting mechanism for establishing any one of the three operational modes (forward, neutral and reverse) and speed-sensing means coacting with the output shaft of the transmission for establishing, with the aid of a second gear-shifting mechanism, different speed ratios in response to shaft speeds passing predetermined levels in either an upward or a downward direction. An automatic decelerator coupled with the engine, responsive to the speed-sensing means, temporarily slows down the engine independently of any driver-actuated engine-control means such as the usual accelerator pedal.

Advantageously, pursuant to another feature of my invention, there is also provided an automatic accelerator coupled with the engine and responsive to the speed-sensing means for temporarily speeding up the engine independently of the driver-actuated pedal.

Pursuant to a further feature of this invention, I provide inhibiting means controlled by the speed-sensing means for making the manually operable selector means ineffectual to change from one mode to another, especially from forward to reverse or vice versa, as long as the shaft speed is beyond its safe range. I also prefer to use timing means responsive to the selector means for activating the aforementioned automatic decelerator for a limited period upon changeover to either the forward or the reverse mode.

BRIEF DESCRIPTION OF THE DRAWING

The above and other features of my invention will now be described in detail with reference to the accompanying drawing in which:

FIG. 3 is a more detailed view of other components of the system of FIG. 1, shown to include additionally an associated internal-combustion engine and a gear-type transmission controlled by the system;

FIG. 6 is a detailed view of a timing circuit shown in block form in FIG. 1;

FIGS. 9 and 10 are tables showing energization patterns of solenoids illustrated in FIGS. 3 and 8; and FIG. 11 is a table showing energization patterns of output leads of the signal generator illustrated in FIGS. 2 and 7.

SPECIFIC DESCRIPTION

Figure 1:
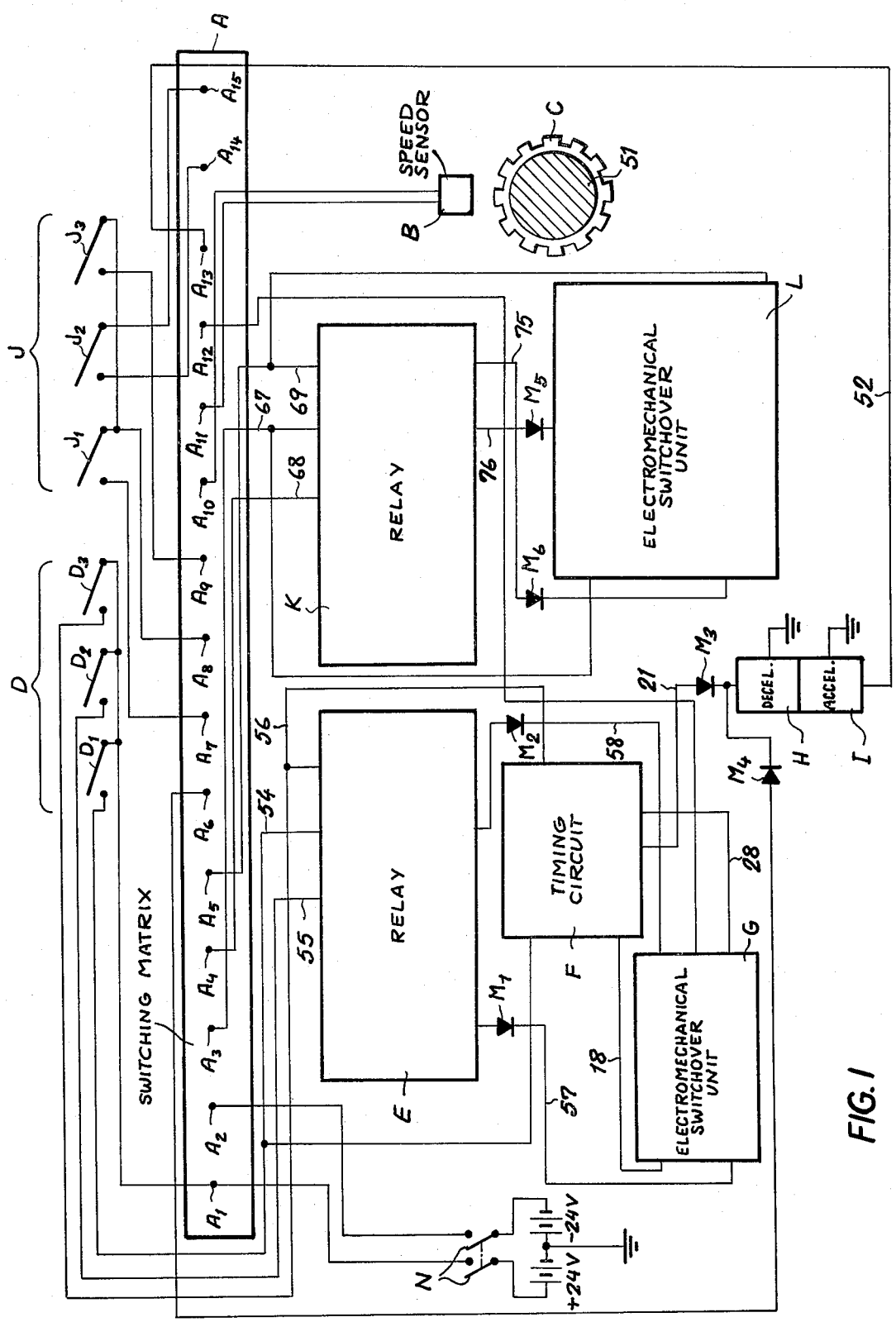
FIG. 1 is a block diagram of a speed-changing system according to my invention.

As illustrated in FIG. 1, my improved speed-changing system associated with a conventional constant-mesh transmission 50 (FIG. 3) of an automotive utility vehicle or other heavy-duty equipment comprises a tachometric switching matrix A having a set of terminals $A_1$–$A_{15}$. Terminals $A_{10}$, $A_{11}$ are connected to a speed sensor B which monitors the rate of rotation of a toothed wheel C rigid with a power shaft 51, i.e. the output shaft of transmission 50 which is driven by an internal-combustion engine 60.

A manual selector switch D comprises three pairs of contacts $D_1$, $D_2$, $D_3$ for establishing a desired mode of operation, i.e. forward, neutral or reverse. These contact pairs are inserted between terminal $A_1$ of matrix A and respective leads 54, 55, 56 extending to an electromagnetic relay E with output leads 57, 58 working into an electromechanical switchover unit G via respective diodes $M_1$, $M_2$. A timing circuit F with inputs joined to leads 54 and 56 has output leads 18 and 28 extending to switchover unit G and another output lead 21, provided with a diode $M_3$, terminating at an electromechanical decelerator H also acting as an acceleration inhibitor; lead 21 is also connected to matrix terminal $A_6$ by way of a diode $M_4$. A second electromagnetic relay K is coupled via leads 67, 68, 69 to respective terminals $A_3$, $A_4$, $A_5$ of matrix A and has two output leads 75, 76 working via diodes $M_5$, $M_6$ into an electromechanical switchover unit L which is also directly connected to terminals $A_3$ and $A_5$ via leads 67 and 69. Another manual selector switch J has three pairs of contacts $J_1$, $J_2$, $J_3$ coacting with terminals $A_7$, $A_8$, $A_9$, $A_{14}$ and $A_{15}$ for modifying the pattern of energization of terminals $A_3$, $A_4$, $A_5$ to prevent upshifts beyond a chosen speed ratio, as more fully described hereinafter. Terminal $A_{12}$ is connected directly to unit G for inhibiting mode changes at speeds above a preset limit. An electromechanical accelerator I has an input connected via a lead 52 to terminal $A_{13}$. Terminals $A_1$ and $A_2$ are connectable upon closure of a master switch N to the poles of a battery supplying them with voltages of +24 V and −24 V, respectively.

Figure 2:
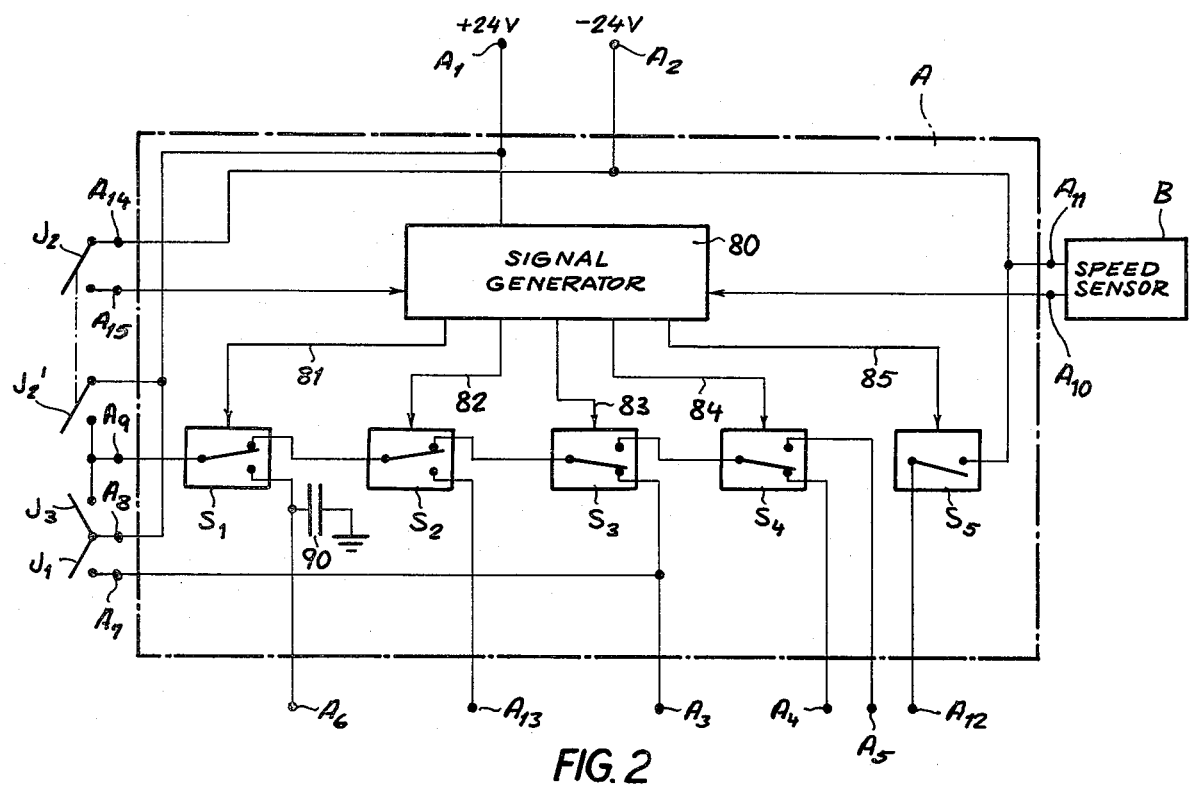
FIG. 2 shows details of a switching matrix included in the system of FIG. 1.

As illustrated in FIG. 2, switching matrix A includes a signal generator 80 (more fully described hereinafter with reference to FIG. 7) with output leads 81, 82, 83, 84 respectively controlling four cascaded electronic or electromagnetic switches $S_1$, $S_2$, $S_3$, $S_4$. The armature of switch $S_1$, tied to terminal $A_9$, can be connected to the positive supply terminal $A_1$ by closure of switch contacts $J_3$ or of another contact pair $J_2'$ ganged with contacts $J_2$. With the system in operation, leads 81 and 82 are normally energized so that the armatures of switches $S_1$ and $S_2$ engage their upper bank contacts as shown, cutting off terminals $A_6$ and $A_{13}$ respectively connected to their lower bank contacts while extending the current path from terminal $A_9$ to the armature of switch $S_3$. The lower bank contact of the latter switch, engaged in the de-energized state of lead 83 are shown, is connected to terminals $A_3$ and $A_7$ in parallel while its upper bank contact is tied to the armature of switch $S_4$ whose lower and upper back contacts are respectively tied to terminals $A_4$ and $A_5$; in the absence of voltage on lead 84, this armature rests on its lower contact as shown. Energization of a further output lead 85 of generator 80 closes another switch $S_5$ to connect terminal $A_{12}$ to the negative supply terminal $A_2$. A capacitor 90 of about 1 mF, inserted between ground and terminal $A_6$, extends the period of energization of that terminal when switch $S_1$ is briefly reversed under circumstances to be described. Closure of switch contacts $J_1$ connects supply terminal $A_1$ directly to terminal $A_3$, independently of the positions of switches $S_1$, $S_2$ and $S_3$. Contacts $J_2$, when closed, connect terminal $A_2$ to terminal $A_{15}$ which is tied to an input lead of generator 80.

Contact pairs $J_1$, $J_2/J_2'$ and $J_3$ are mechanically interlocked so that only one of them can be manually closed at any time. A similar relationship exists among contact pairs $D_1$, $D_2$ and $D_3$ shown in FIG. 1. Selector switches J and D may comprise a pair of conventional three-position shift levers so that one contact pair of each switch must always be closed.

In FIG. 3 I have illustrated details of the electromechanical switchover units G and L. Unit G comprises four solenoids $G_1$, $G_2$, $G_3$, $G_4$ whose coils are inserted between the grounded midpoint of the power supply (cf. FIG. 1) and respective leads 18, 57, 58 and 28 in series with individual resistors $Z_1$, $Z_2$, $Z_3$, $Z_4$. Unit L, similarly, comprises four solenoids $L_1$, $L_2$, $L_3$, $L_4$ whose coils are inserted between ground and respective leads 67, 75, 76, 69. All these solenoids operate fluidic valves serving for the pressurization of pneumatic jacks which control the mode-changing and gear-shifting functions described hereinafter with reference to FIGS. 8-11.

Engine 60, illustrated schematically in FIG. 3, has the usual manifold duct 96 provided with a butterfly valve 97 which is linked with an accelerator pedal 98 to control the admission of a fuel/air mixture to the several combustion cylinders (not shown) as is well known in the art. Decelerator H comprises a solenoid coil 61, inserted between lead 21 and ground, which controls an ancillary valve 63 in series with butterfly valve 97 to throttle the fuel supply independently of the position of pedal 98. Accelerator I has a solenoid coil 62, inserted between lead 52 and ground, which controls another ancillary valve 64 in a bypass 99 of duct 96 to increase the supply independently of the pedal position. Normally, valve 63 is wide open and valve 64 is fully closed as shown. Though the solenoids of speed-control units H and I have been shown for the sake of simplicity to be directly connected to valves 63 and 64, they may control these valves by means of fluidic actuators such as pneumatic jacks.

An integrator circuit 105 inserted between terminals $A_{10}$ and $A_{11}$ in series with a pick-up coil 104, forming part of speed sensor B, is shown to comprise a differential amplifier with a grounded noninverting input and with and R/C network lying in a feedback path between its output and its inverting input.

The junctions of solenoids $G_1$-$G_4$ with resistors $Z_1$-$Z_4$ are connected, via respective diodes $M_9$, $M_{10}$, $M_{11}$ and $M_{12}$, to the normally open-circuited terminal $A_{12}$. Closure of switch $S_5$ (FIG. 2) at shaft speeds above a certain limit, resulting in the application of negative voltage to that terminal, disables each of these solenoids.

Figure 4:
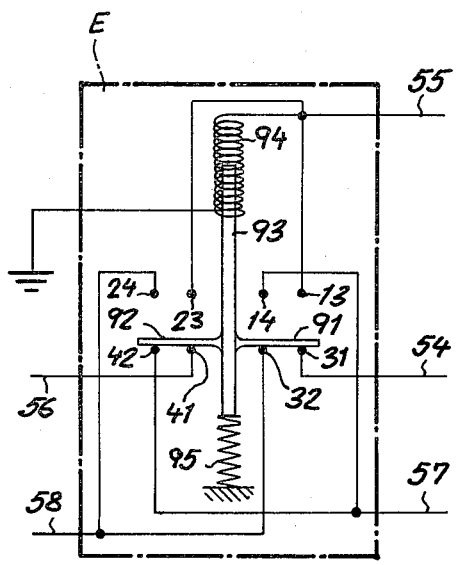
FIGS. 4 and 5 are detailed views of two relays included in the system of FIG. 1.

As shown in FIG. 4, relay E comprises a solenoid coil 94 whose core 93 carries a pair of electrically conductive but mutually insulated arms 91, 92 which are normally biased by a spring 95 into engagement with respective pairs of bank contacts 31, 32 and 41, 42 to interconnect leads 54, 58 and 56, 57. Energization of coil 94, inserted between lead 55 and ground, moves the arms 91 and 92 into engagement with respective contact pairs 13, 14 and 23, 24 to connect lead 55 on the one hand to lead 57 and on the other hand to lead 58.

Figure 5:
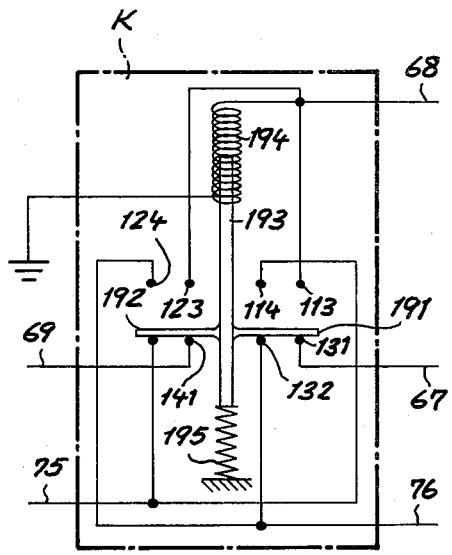

Analogously, relay K shown in FIG. 5 comprises conductive arms 191, 192 on the core 193 of a solenoid coil 194, inserted between lead 68 and ground, as well as a biasing spring 195. In the de-energized state of the solenoid, arms 191 and 192 bridge respective contact pairs 131, 132 and 141, 142 to interconnect leads 67, 76 and 69, 75. When the relay is operated, these arms engage respective contact pairs 113, 114 and 123, 124 to connect lead 68 on the one hand to lead 75 and on the other hand to lead 76.

Timing circuit F has been shown in FIG. 6 as comprising two electromagnetic or electronic switches $S_6$ and $S_7$ with armatures 15 and 25 respectively connected via diodes $M_7$ and $M_8$ to leads 54 and 56, these leads having branches extending to an OR gate OG which works into a pulse generator such as a monoflop $MF_0$. Armatures 15 and 25 normally stand on bank contacts tied to leads 18 and 28. When monoflop $MF_0$ is tripped into its off-normal condition, however, it temperarily energizes an output lead 65 which reverses the switches $S_6$ and $S_7$ whereby their armatures engage other bank contacts respectively tied to leads 16 and 26 which merge into the lead 21.

Figure 7:
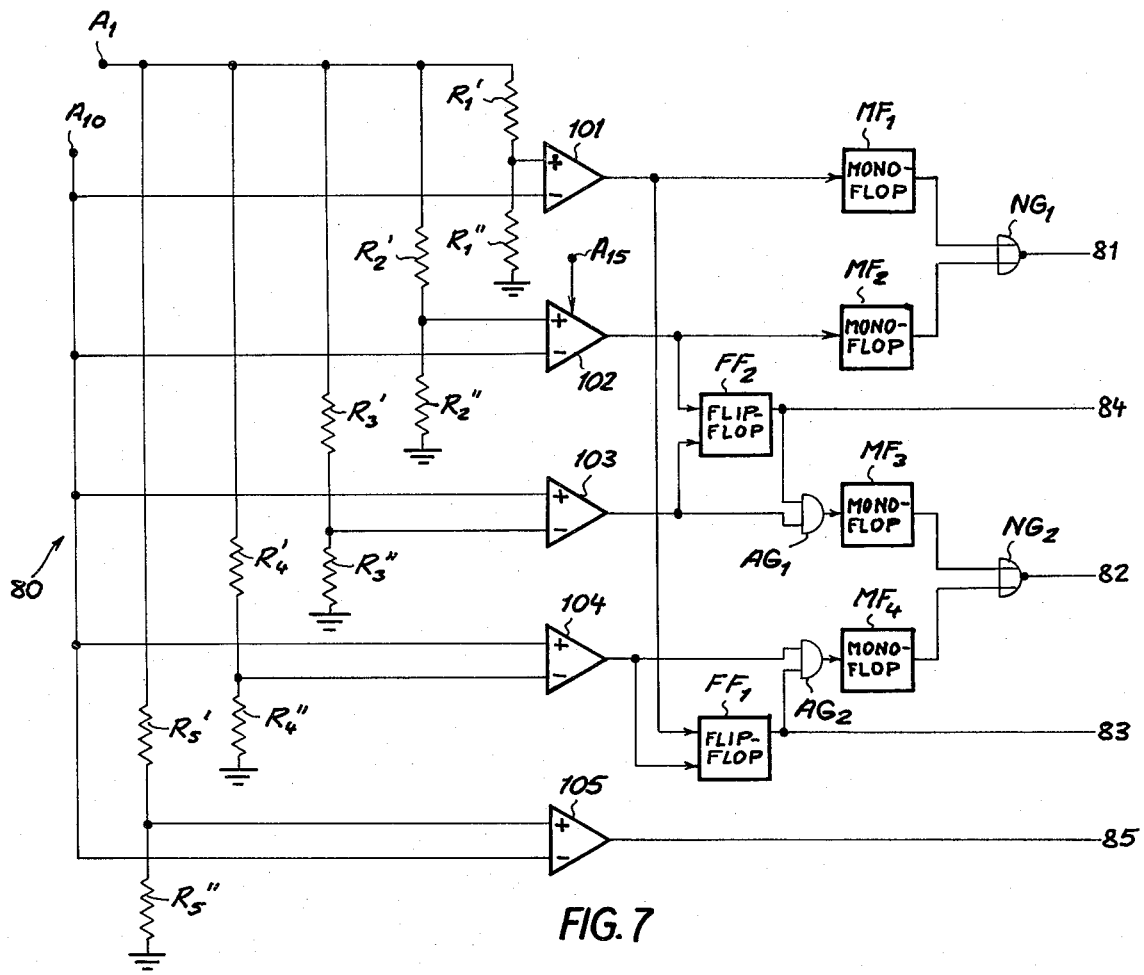
FIG. 7 is a detailed view of a signal generator also shown as a block in FIG. 1.

In FIG. 7 I have shown details of the signal generator 80 already briefly described with reference to FIG. 2. Five voltage comparators 101-105 have inputs connected to terminal $A_{10}$ in the output of speed sensor B (FIG. 2), their other inputs being positively biased by respective voltage dividers inserted between supply terminal $A_1$ and ground. These voltage dividers consist of resistors $R_1'$, $R_1''$ in the case of comparator 101, resistors $R_2'$, $R_2''$ in the case of comparator 102, resistors $R_3'$, $R_3''$ in the case of comparator 103, resistors $R_4'$, $R_4''$ in the case of comparator 104, and resistors $R_5'$, $R_5''$ in the case of comparator 105. Naturally, these several voltage dividers could be replaced by a single resistor chain having the requisite number of taps. Comparators 101, 102, 103, 104 work into respective monoflops $MF_1$, $MF_2$, $MF_3$, $MF_4$ and, in parallel therewith, into a pair of flip-flops $FF_1$, $FF_2$. The outpts of monoflops $MF_1$ and $MF_2$ are connected via a NOR gate $NG_1$ to lead 81; similarly, the outputs of monoflops $MF_3$ and $MF_4$ are connected by way of a NOR gate $NG_2$ to lead 82. Flip-flop $FF_1$, whose set output is tied to the lead 83, has a setting input connected to comparator 101 and a resetting input connected to comparator 104. Analogously, flip-flop $FF_2$ has its set output tied to lead 84 and its setting and resetting inputs respectively connected to comparators 102 and 103. Comparator 102 has a blocking input tied to terminal $A_{15}$. Two AND gates $AG_1$ and $AG_2$, inserted between comparators 103, 104 and monoflops $MF_3$, $MF_4$, have inputs connected to leads 84 and 83, respectively.

Figure 8:
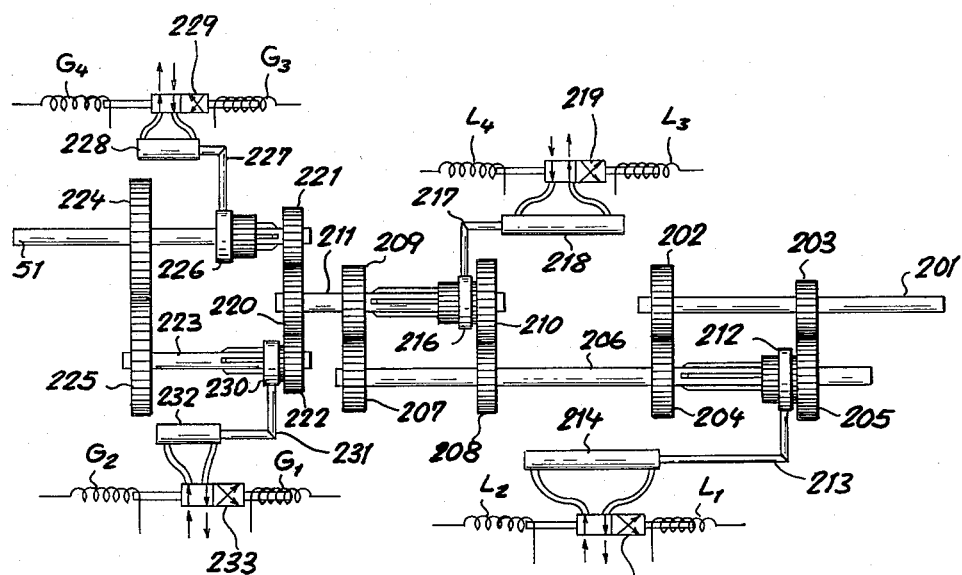
FIG. 8 is a more detailed view of the transmission shown in FIG. 3.

The transmission 50 schematically illustrated in FIG. 3 has been shown in greater detail in FIG. 8. An input shaft 201, driven from engine 60 with the possible interposition of a torque converter, is rigid with a pair of gears 202, 203 which are in constant mesh with respective gears 204, 205 that are freely rotatable on an ancillary shaft 206. Gear 205 has more teeth than gear 203 whereas gears 203 and 204 are of the same size. Either of gears 204, 205 can be selectively coupled with shaft 206 by a clutch gear 212 which is slidable on a splined portion of that shaft by means of a fork 213 rigid with the plunger of a pneumatic jack whose double-acting cylinder 214 receives oil from a nonillustrated compressor through a valve 215 under the control of solenoids $L_1$ and $L_2$. Two other gears 207 and 208 keyed to shaft 206 mesh with respective gears 209 and 210 of equal and larger size, respectively, idling on another ancillary shaft 211 with which they can be selectively coupled by a clutch gear 216 sliding on a splined shaft portion. Clutch gear 216 is engaged by a fork 217 rigid with the plunger of another pneumatic jack whose double-acting cylinder 218 receives air from the aforementioned compressor by way of a valve 219 under the control of solenoids $L_3$ and $L_4$.

Shaft 211 is rigid with a gear 220 meshing with two gears 221 and 22 which are freely rotatable on output shaft 51 and on ancillary shaft 223, respectively. A gear 224, keyed to shaft 51, meshes with a gear 225 keyed to shaft 223. Gears 220, 221, 222 are shown to be of the same size, as are gears 224 and 225, though this need not be the case. A clutch gear 226, slidable on a splined portion of shaft 51, is shiftable by a fork 227 into engagement with gear 221 for coupling it with that shaft; fork 227 is an extension of the plunger of a third pneumatic jack whose double-acting cylinder 228 is pressurizable via a valve 229 controlled by solenoids $G_3$ and $G_4$. Similarly, a splined portion of shaft 223 carries a clutch gear 230 shiftable by a fork 231 into engagement with gear 222, fork 231 being rigid with the plunger of a fourth pneumatic jack whose double-acting cylinder 232 receives compressed air through a valve 233 controlled by solenoids $G_1$ and $G_2$.

In the illustrated clutch position, solenoids $L_1$, $L_3$, $G_1$ and $G_3$ are operated to let their respective fluidic clutch actuators immobilize the gears 205, 210 and 230 on their shafts while gears 204, 209 and 221 are idle. The power train from input shaft 201 to output shaft 51 thus includes the two step-down stages 203, 205 and 208, 210 in cascade as well as the gear assembly 220, 222, 225 and 224 interconnecting shafts 211 and 51. This corresponds to the lowest speed ratio ("first gear") in the forward mode, as can also be seen from the tables of FIGS. 9 and 10 showing the aforementioned solenoids to be active in the described state of the transmission. The tables further indicate, as can be verified from an inspection of FIG. 8, that solenoids $L_2$ and $L_3$ are energized for the intermediate speed ratio ("second gear"), solenoids $L_2$ and $L_4$ establish the highest speed ratio ("third gear"), solenoids $G_2$ and $G_3$ are used for the neutral mode (clutch gears 216 and 230 both disengaged), and the joint operation of solenoids $G_2$ and $G_4$ serves for driving in reverse. The system, accordingly, enables the selection of three forward speed ratios and three reverse speed ratios (though not necessarily of the same magnitudes in the two modes) with the aid of switch contacts $D_1$–$D_3$, with automatic changeover among these speed ratios to the extent permitted by switch contacts $J_1$–$J_3$, as will become apparent hereinafter.

The several clutch-control valves 215, 219, 229 and 233 are maintained, frictionally or otherwise, in the position into which they were last shifted by one of the associated solenoids, even if that solenoid becomes deenergized.

As will be apparent from FIG. 8, solenoids $G_1$ and $G_4$ must never be energized simultaneously since this would cause the transmission to be blocked. On a changeover from forward to reverse, therefore, operation of solenoid $G_4$ (brought about by closure of switch contacts $D_3$ as described below) follows that of solenoid $G_2$ with a lag $\Delta T$, indicated in FIG. 9, which represents the delay period introduced by timing circuit F. In like manner, a changeover from reverse to forward (closure of switch contacts $D_1$) operates solenoid $G_3$ first and solenoid $G_1$ later after a similar lag $\Delta T$. These delay periods are designed to ensure the de-energization of the previously operated relay solenoid $G_1$ or $G_4$, respectively. Such a changeover, moreover, cannot occur at speeds higher than the threshold established by comparator 105 (FIG. 7) at which closure of switch $S_5$ (FIG. 2) extends negative voltage from supply terminal $A_2$ to terminal $A_{12}$, thereby disabling all solenoids $G_1$–$G_4$.

The table of FIG. 11 shows the pattern of energization of generator leads 81–84 in the various gear positions as well as during intervening upshifting and downshifting. Leads 81 and 82 carry voltage in every gear position but are temporarily de-energized on the upshift and on the downshift, respectively. Lead 83 is energized in second and third gear while lead 84 has a positive potential only in third gear.

Operation

Let us assume that the system is taken into operation, by closure of the master switch N under the control of the usual ignition key, with contacts $D_1$ and $J_3$ of selector switches D and J closed as indicated in FIG. 1, thereby establishing the forward mode and automatic switchover among all three speed ratios. Positive voltage applied to lead 54 is fed via contacts 31, 32 of relay E to lead 58 to operate the solenoid $G_3$. This voltage also trips the monoflop $MF_0$ of timing circuit F, FIG. 6, so that switch $S_6$ is reversed for a brief period corresponding to the aforementioned time lag $\Delta T$ with consequent energization of solenoid coil 61 in decelerator H; during this period $\Delta T$, therefore, ancillary valve 63 throttles the manifold 96 of engine 60 and prevents any immediate acceleration. At the end of that period, monoflop $MF_0$ returns to normal and switch $S_6$ extends the potential of lead 54 to lead 18 with resulting energization of solenoid $G_1$. With the vehicle initially at standstill, comparators 103 and 104 (whose subtractive inputs are connected to the taps of voltage dividers $R_3'/R_3''$ and $R_4'/R_4''$) conduct and energize the resetting inputs of flip-flops $FF_2$ and $FF_1$ whereby leads 83 and 84 are cut off from the power supply and switches $S_3$ and $S_4$ are in their illustrated position. None of the monoflops of FIG. 7 is tripped at this time and current flows from supply terminal $A_1$ via contacts $J_3$, terminal $A_9$ and switches $S_1$–$S_3$ to terminal $A_3$ and lead 67, thence to solenoid $L_1$ and in parallel therewith over contacts 131, 132 of relay K to lead 76 and solenoid $L_3$. With solenoids $G_1$, $G_3$, $L_1$ and $L_3$ operated, the transmission 50 is in first gear and forward drive as illustrated in FIG. 8.

As the driver accelerates the vehicle by stepping on the pedal 98 (FIG. 3), output shaft 51 reaches a velocity which drives the output voltage of sensor B and thus the potential of terminal $A_{10}$ to a value above the level preset by voltage divider $R_1'/R_1''$ so that comparator 101, whose additive input is tied to the tap of that divider, conducts and sets the flip-flop $FF_1$ while also tripping the monoflop $MF_1$. With NOR gate $NG_1$ temporarily cut off, lead 81 is de-energized so that switch $S_1$ connects terminal $A_9$ to terminal $A_6$ and lead 21 at the input of decelerator H, causing temporary closure of valve 63 whereby engine shaft 201 (FIG. 8) is forced to slow down even as flip-flop $FF_1$ energizes the lead 83 to extend the current path to terminal $A_4$. The resulting energization of lead 68 in series with coil 194, after the elapse of the off-normal period of monoflop $MF_1$ and restoration of switch $S_1$ to normal, reverses the relay K so that voltage on lead 68 now reaches the solenoids $L_2$ and $L_3$ by way of leads 75 and 76. Thanks to the presence of capacitor 90, however, terminal $A_6$ continues energized for a while after the upshift into second gear to prevent any acceleration of shaft 201 until the shift of clutch member 212 from gear 205 to gear 204 (FIG. 8) has been completed.

If load conditions permit a further acceleration of shaft 51 to the point where the voltage on terminal $A_{10}$ surpasses the threshold of comparator 102 as determined by the voltage divider $R_2'/R_2''$ whose tap is tied to the additive input of this comparator, flip-flop $FF_2$ is set to energize the lead 84 while monoflop $MF_2$ is tripped for another temporary cutoff of lead 81 and reversal of switch $S_1$. Upon the termination of the off-normal period of this monoflop, voltage on terminal $A_9$ is extended by switches $S_1$–$S_4$ to terminal $A_5$ and lead 69 whereby solenoid $L_4$ is operated. Since the release of relay K by the de-energization of terminal $A_4$ has restored the connection between leads 69 and 75, solenoid $L_2$ is reoperated. With clutch member 216 now shifted into engagement with gear 209, the power train in FIG. 8 extends from input shaft 201 by way of gears 202, 204, 207, 209, 220, 222, 225, 224 to shaft 51 which rotates codirectionally with shaft 201 and at the same speed. This is the third-gear forward position. Again, decelerator H remains effective beyond the upshift.

The temporary de-energization of lead 81 during upshifting from first to second gear and from second to third gear has been indicated diagrammatically in the first line of the table of FIG. 11.

If an increase in load and/or a partial retraction of pedal 98 decelerates the output shaft 51, the voltage on terminal $A_{10}$ eventually drops below the preselected potential on the tap of voltage divider $R_3'/R_3''$ (which should be substantially lower than the corresponding potential of divider $R_2'/R_2''$) so that comparator 103, cut off prior to the setting of flip-flop $FF_2$, conducts and trips the monoflop $MF_3$ inasmuch as AND gate $AG_1$ is blocked by the resetting of flip-flop $FF_2$ whose response to the output signal of comparator 103 is slightly slower than that of monoflop $MF_3$. The latter temporarily cuts off the NOR gate $NG_2$ with de-energization of lead 82 and reversal of switch $S_2$ whereby terminal $A_{13}$ is driven positive and, via lead 52, energizes the solenoid coil 62 of accelerator I so that engine shaft 201 speeds up. At the end of the off-normal period of monoflop $MF_3$, switch $S_2$ reconnects terminal $A_9$ to terminal $A_4$ so that the transmission returns to its second-gear position.

In an analogous manner, a further deceleration of output shaft 51 to lower the voltage of terminal $A_{10}$ to less than the threshold established by voltage divider $R_4'/R_4''$ (substantially lower than the threshold of divider $R_1'/R_1''$) actuates the comparator 104 with consequent tripping of monoflop $MF_4$ via AND gate $AG_2$, resetting of flip-flop $FF_1$ to cut off the lead 83, and temporary de-energization of lead 82 so that switch $S_2$ is again reversed and reactivates the accelerator I for a limited period after which the transmission reverts to its first-gear position.

The temporary de-energization of lead 82 during downshifting from third to second gear and from second to first gear has been diagrammatically indicated in the second line of the table of FIG. 11. If desired, terminal $A_{13}$ may also be provided with signal-storing means such as capacitor 90 to lengthen the operating period of accelerator I.

If switch contacts $J_2/J_2'$ are closed in lieu of contacts $J_3$, negative voltage from terminal $A_2$ is supplied to terminal $A_{15}$ and thence to the blocking input of comparator 102 to prevent the setting of flip-flop 84 so that the upshift to third gear cannot take place. Closure of switch contacts $J_1$ connects output terminal $A_3$ permanently to supply terminal $A_1$ by way of intermediate terminal $A_8$; with terminal $A_9$ disconnected from the supply, none of output terminals $A_4$, $A_5$, $A_6$, $A_{13}$ can be energized and the system remains in first gear regardless of shaft speed.

Whenever shaft 51 rotates at a speed incompatible with a changeover from forward to reverse or vice versa, solenoids $G_1$–$G_4$ are disabled as comparator 105 conducts and energizes lead 85 to close the switch $S_5$ whereby terminal $A_{12}$ is connected to the negative supply terminal $A_2$. Any modification in the position of mode-selector switch D under these circumstances will therefore be without immediate effect. Thus, the driver may close contacts $D_3$ in lieu of contacts $D_1$ to change from forward to reverse, yet this changeover will not take place until the shaft has slowed down sufficiently for safe operation. At that point, with solenoids $G_1$ and $G_3$ already deactivated, solenoids $G_2$ and $G_4$ will be energized consecutively by voltage on lead 56 extended to lead 57 by relay E and to lead 28 by timing circuit F. Similarly, a return to forward drive by reclosure of contacts $D_1$ in place of contacts $D_3$ will take effect only on standstill or at low speeds, with consecutive energization of solenoids $G_3$ and $G_1$ by voltage on lead 54 extended first to lead 58 and then to lead 18. The intervention of timing circuit F in each instance prevents any premature acceleration of engine 60 by activating the decelerator H for the delay period $\Delta T$ required to complete the changeover. On a shift into neutral by closure of contacts $D_2$, again within the permissible speed range, solenoids $G_2$ and $G_3$ (if previously deactivated) operate concurrently as seen from FIG. 9.

Although the operations of decelerator H and accelerator I during downshifting and upshifting have no direct effect on the speed of output shaft 51, the offset between the threshold voltages delivered to comparators 101, 102 on the one hand and comparators 104, 103 on the other hand should be sufficient to prevent resetting of flip-flop $FF_1$ or $FF_2$ during the switchover period in which it has been set.

I claim:

1. An automatic speed-changing system for automotive equipment provided with an internal-combustion engine, a reversible transmission driven by said engine, said transmission having an output shaft adapted to be coupled to said engine by a shiftable gear train provided with first gear-shifting means for selectively establishing a forward mode, a neutral mode and a reverse mode and with second gear-shifting means for establishing any one of a plurality of different speed ratios between said engine and said output shaft, and driver-actuated means for changing the operating speed of said engine, the combination therewith of:

manually operable selector means connected to said first gear-shifting means for establishing any one of said modes;

speed-sensing means coacting with said output shaft and connected to said second gear-shifting means for establishing different speed ratios in response to shaft speeds passing predetermined levels; and automatic decelerating means coupled with said engine and responsive to said speed-sensing means for temporarily slowing down said engine independently of said driver-actuated means during upshifting from a lower speed ratio to a higher speed ratio.

2. A speed-changing system as defined in claim 1, further comprising automatic accelerating means coupled with said engine and responsive to said speed-sensing means for temporarily speeding up said engine independently of said driver-actuated means during downshifting from a higher speed ratio to a lower speed ratio.

3. A speed-changing system as defined in claim 1 or 2, further comprising inhibiting means controlled by said speed-sensing means for making said selector means ineffectual to change from one of said modes to another at shaft speeds exceeding a preset limit.

4. A speed-changing system as defined in claim 3, further comprising timing means responsive to said selector means for activating said decelerating means for a limited period upon a changeover to either of said forward and reverse modes.

5. A speed-changing system as defined in claim 1 or 2 wherein said first gear-shifting means comprises a plurality of valve-operating solenoids including a first pair of solenoids energizable to establish said forward mode and a second pair of solenoids energizable to establish said reverse mode, said timing means being activatable by said selector means concurrently with the energization of one of the solenoids of either pair for delaying the energization of the other solenoid of the same pair.

6. A speed-changing system as defined in claim 1 or 2 wherein said second gear-shifting means comprises a plurality of valve-operating solenoids energizable in different combinations to establish a low speed ratio, an intermediate speed ratio and a high speed ratio, further comprising manually operable blocking means for selectively preventing the energization of certain of said solenoids to inhibit a shift to at least said high speed ratio.

* * * * *